(No Model.)

J. LAMPLUGH.
FISH PLATE.

No. 419,684.　　　　　　Patented Jan. 21, 1890.

WITNESSES:　　　　　　INVENTOR
　　　　　　　　　　　Jacob Lamplugh
　　　　　　　　　　　by his attorney

UNITED STATES PATENT OFFICE.

JACOB LAMPLUGH, OF PHILADELPHIA, PENNSYLVANIA.

FISH-PLATE.

SPECIFICATION forming part of Letters Patent No. 419,684, dated January 21, 1890.

Application filed March 9, 1889. Serial No. 302,664. (No model.)

*To all whom it may concern:*

Be it known that I, JACOB LAMPLUGH, a citizen of the United States, residing at Philadelphia, in the county of Philadelphia and State of Pennsylvania, have invented certain new and useful Improvements in Fish-Plates, of which the following is a specification, reference being had therein to the accompanying drawings.

My invention relates to improvements in fish-plates for joining railroad-rails; and the object of my invention is to furnish an improvement in the devices used for clamping the fish-plates against the sides of the rails. The usual practice heretofore has been to pass a bolt through drilled or punched holes in the fish-plates and rails, said bolt being furnished with a head at one end and being threaded at the other, and to secure said bolt and to draw the fish-plates against the rails by means of a nut on the threaded portion of the bolt. The jar caused by a passing train causes the nut to become loosened, and hence the fish-plates become loose and do not keep the rails in line. Nut-locks of numerous forms have been used to keep the nuts from turning, but the results have not been entirely satisfactory.

In my improvement I thread the entire shank of the bolt and tap out the holes in the fish-plates through which the bolt passes. The fish-plates and bolt are so arranged that when the bolt is entirely screwed in the fish-plates are drawn against the rails. Should the bolt become loosened the threads upon the bolt will hold the fish-plates in place until the bolt has been entirely unscrewed from the plate farthest from its head. As an additional security, I bore and tap a hole in the center of the end of the bolt and place a screw in this hole. The head of said screw bears against a washer, which is placed over the end of the bolt. The thread upon the bolt is right-handed and that upon the screw left-handed, and hence it would be impossible to unscrew the bolt from the fish-plates without stripping the threads from said screw.

Figure 1:
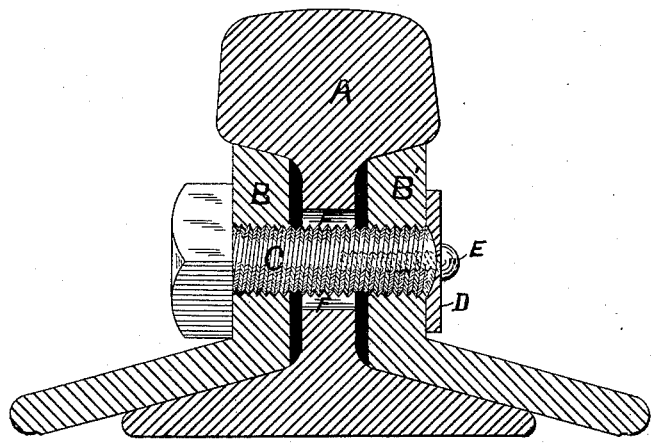
Figure 2:

In the drawings, Figure 1 is a transverse section through a rail and fish-plates embodying my improvements; and Fig. 2, an elevation of the small screw which is placed in the bolt to keep it from turning.

A is a rail; R B', fish-plates; C, bolt for securing fish-plates; D, a washer; E, small screw.

The bolt C is threaded its entire length, as shown, and is screwed into fish-plate B. It passes through hole F in the rail and is screwed into fish-plate B. The bolt C holds the fish-plates firmly against the rails, and should this bolt become unscrewed it will hold the plates securely until it becomes unscrewed entirely from plate B'. The thread upon bolt C being right-handed, I drill a hole in the center of the end of this bolt and tap a left-handed thread in it, and by placing a washer D over the end of the bolt and a left-handed screw E in this tapped hole, the head of screw E bearing against the washer D, the bolt C cannot be unscrewed, for this screw E acts as a perfect lock and becomes tighter when the bolt is unscrewed.

I claim—

The combination of the rail, fish-plates with threaded holes, threaded bolt C, bored out at its end and tapped, washer D, and screw E, all substantially as and for the purposes set forth.

In testimony whereof I affix my signature in the presence of two witnesses.

JACOB LAMPLUGH.

Witnesses:
 JOHN F. HALBACH,
 WALTER W. CALMORE.